US008026984B2

United States Patent
Lee et al.

(10) Patent No.: US 8,026,984 B2
(45) Date of Patent: Sep. 27, 2011

(54) MULTIMEDIA TELEVISION (75) Inventors: Mu-Hsuan Lee, Chung Ho (TW);
Shen-Chin Chao, Chung Ho (TW);
Chung-Shih Chen, Chung Ho (TW)

(73) Assignee: Amtran Technology Co., Ltd., Chung Ho (TW)

( * ) Notice: Subject to any disclaimer, the term of this patent is extended or adjusted under 35 U.S.C. 154(b) by 1122 days.

(21) Appl. No.: 11/802,205

(22) Filed: May 21, 2007

(65) Prior Publication Data
US 2008/0068502 A1 Mar. 20, 2008

(30) Foreign Application Priority Data
Sep. 15, 2006 (TW) ................................ 95216553 U (51) Int. Cl.
*H04N 5/60* (2006.01)
(52) U.S. Cl. ........................................ 348/738; 381/306
(58) Field of Classification Search .................. 348/738, 348/725, 731, 553; 381/307, 306, 80, 81, 381/119, 333; 725/100, 131, 139, 151, 153, 725/141, 133; *H04N 5/60, 5/44*
See application file for complete search history.

(56) References Cited

U.S. PATENT DOCUMENTS
2002/0146139 A1 * 10/2002 Oplinger ....................... 381/306
2002/0149704 A1 * 10/2002 Kano et al. .................... 348/738
* cited by examiner

*Primary Examiner* — Sherrie Hsia
(74) *Attorney, Agent, or Firm* — Morris Manning Martin LLP; Tim Tingkang Xia, Esq.

(57) ABSTRACT

A multimedia television is provided. The multimedia television includes a video playback apparatus, an audio processing device, M front loudspeakers, a rear audio playback apparatus, and a mixing device. The video playback apparatus is used for displaying a video signal. The audio processing device processes an audio signal into a multi-channel audio signal consisting of M front sub-audio signals and N rear sub-audio signals. Each front loudspeaker plays back one corresponding front sub-audio signal. And, the mixing device mixes the N rear sub-audio signals into a mixed audio signal, which is then wirelessly transmitted to the rear audio playback apparatus. After the mixed audio signal is processed into N rear sub-audio signals, N rear loudspeakers in the rear audio playback apparatus playback the N rear sub-audio signals.

14 Claims, 6 Drawing Sheets

MULTIMEDIA TELEVISION

BACKGROUND OF THE INVENTION

1. Field of the Invention

The invention relates to a multimedia system and, more particularly, to a multimedia television which can playback an audio/video signal.

2. Description of the Prior Art

In recent years, with the vigorous development of various electronic products, multimedia systems, such as a home theater, become more and more popular. In a multimedia system, except a monitor for displaying images, the most important hardware is a stereo. Taking a 5.1-channel stereo for example, it includes a left loudspeaker, a right loudspeaker, a middle loudspeaker, a left rear loudspeaker, a right rear loudspeaker, and a bass loudspeaker. The loudspeakers are located at appropriate locations and directions and allowed to playback different or the same audio signals. By doing so, a user can experience stereophonic sound effects.

Although the stereo can provide sound effect better than that of a traditional 2-channel stereo, the complicated connecting lines between these loudspeakers always make users inconvenient. In addition, the connecting lines with considerable length are not pleasing to the eye.

SUMMARY OF THE INVENTION

In order to solve the above problems, the invention provides a novel multimedia system. The multimedia system according to the invention transmits an audio signal in a wireless way between an audio processing/controlling device and parts of loudspeakers. Thus, the problems induced from using wires to connect the loudspeakers in the prior art can be prevented.

According to the invention, a preferred embodiment is a multimedia television. The multimedia television includes a receiver, a video playback apparatus, an audio processing/controlling device, M front loudspeaker, a mixing device, a first antenna, a transmitting device, and a rear audio playback apparatus.

The receiver is used to receive an audio/video signal; the audio/video signal includes an audio signal and a video signal. The receiver outputs the audio signal and the video signal respectively. The video playback apparatus is electrically connected to the receiver and is used to receive and display the video signal outputted by the receiver. The audio processing/controlling device is used to receive the audio signal outputted by the receiver and selectively process the audio signal into a multi-channel audio signal. The multi-channel audio signal includes M front sub-audio signals and N rear sub-audio signals, wherein M and N are positive integers. The audio processing/controlling device outputs the M front sub-audio signals and the N rear sub-audio signals respectively.

Each of the front loudspeakers is corresponding to one of the M front sub-audio signals and is used to receive and playback the corresponding front sub-audio signal respectively. The mixing device is used to receive the N rear sub-audio signals and process the N rear sub-audio signals into at least one mixed audio signal. The transmitting device is electrically connected between the mixing device and the first antenna. The transmitting device receives the at least one mixed audio signal from the mixing device and transmits the at least one mixed audio signal via the first antenna.

The rear audio playback apparatus includes a second antenna, a receiving device, an anti-mixing device, and N rear loudspeakers. The receiving device receives the at least one mixed audio signal via the second antenna. The anti-mixing device receives the at least one mixed audio signal from the receiving device, processes the at least one mixed audio signal into the N rear sub-audio signals, and outputs the N rear sub-audio signals respectively. Each of the rear loudspeakers is corresponding to one of the N rear sub-audio signals and is used to receive and playback the corresponding rear sub-audio signal respectively.

The advantage and spirit of the invention may be understood by the following recitations together with the appended drawings.

DETAILED DESCRIPTION OF THE INVENTION

The invention provides a multi-media system. The multimedia system, based on the invention, transmits audio signals in a wireless way between an audio processing/controlling device and parts of loudspeakers. Thus, the problems induced from using wires to connect the loudspeakers in the prior art can be prevented.

Figure 1:
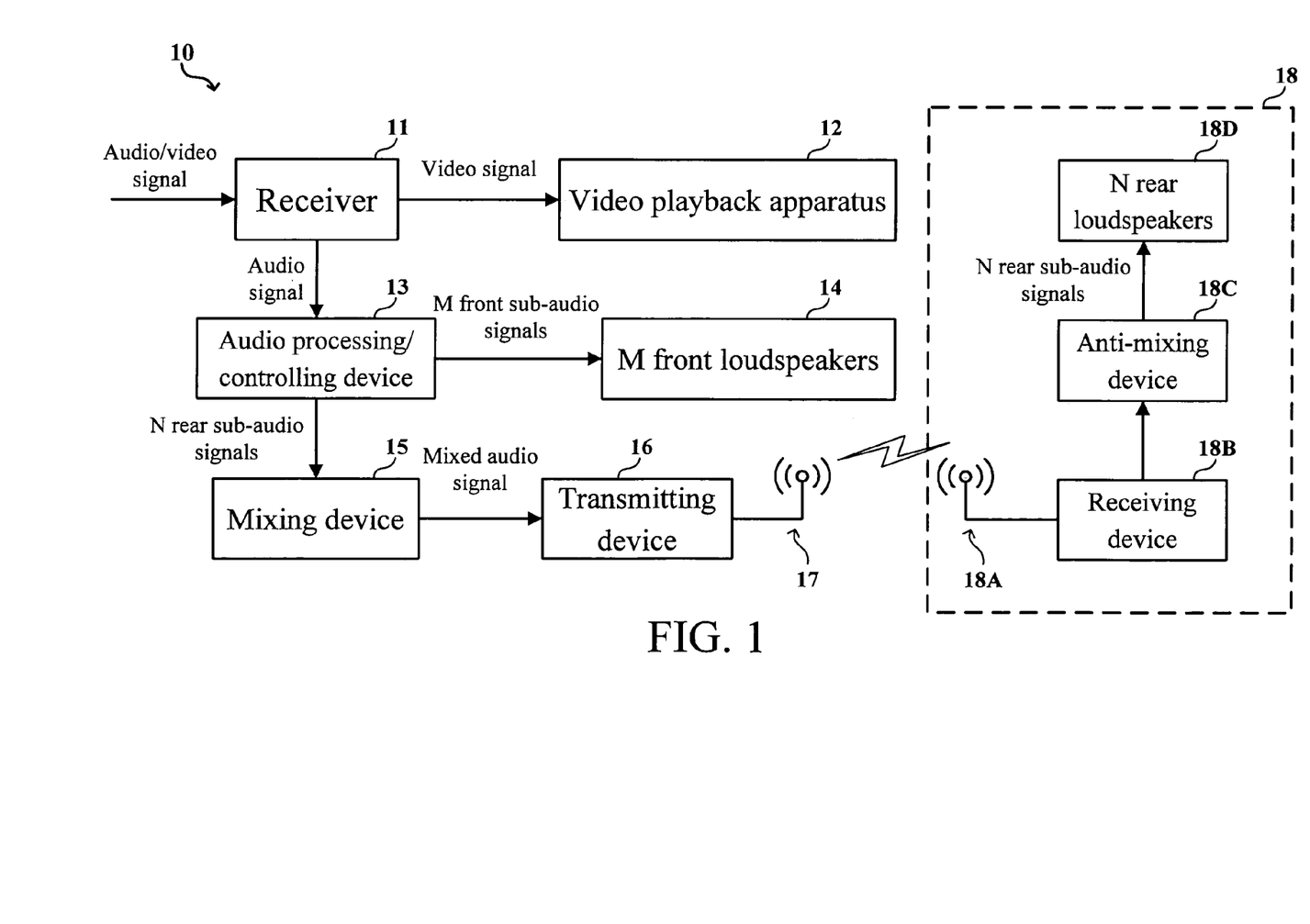
FIG. 1 is a functional block diagram of the multi-media television according to a preferred embodiment of the invention.

According to the invention, a preferred embodiment is a multimedia television. Referring to FIG. 1, FIG. 1 is a functional block diagram of the multi-media television. The multimedia television 10 includes a receiver 11, a video playback apparatus 12, an audio processing/controlling device 13, M front loudspeaker 14, a mixing device 15, a transmitting device 16, a first antenna 17, and a rear audio playback apparatus 18.

The rear audio playback apparatus 18 includes a second antenna 18A, a receiving device 18B, an anti-mixing device 18C, and N rear loudspeakers 18D.

The receiver 11 is used to receive an audio/video signal; the audio/video signal includes an audio signal and a video signal. And the receiver 11 outputs the audio signal and the video signal respectively. The video playback apparatus 12 is electrically connected to the receiver 11 and is used to receive and display the video signal outputted by the receiver 11. The audio processing/controlling device 13 is used to receive the audio signal outputted by the receiver 11 and selectively process the audio signal into a multi-channel audio signal. The multi-channel audio signal includes M front sub-audio signals and N rear sub-audio signals, wherein M and N are positive integers. The audio processing/controlling device 13 outputs the M front sub-audio signals and the N rear sub-audio signals respectively.

Each of the front loudspeakers 14 is corresponding to one of the M front sub-audio signals and is used to receive and playback the corresponding front sub-audio signal respectively. The mixing device 15 is used to receive the N rear sub-audio signals and process the N rear sub-audio signals into at least one mixed audio signal. The transmitting device 16 is electrically connected between the mixing device 15 and the first antenna 17. The transmitting device 16 receives the at least one mixed audio signal from the mixing device 15 and transmits the at least one mixed audio signal via the first antenna 17.

The receiving device 18B of the rear audio playback apparatus 18 receives the at least one mixed audio signal via the second antenna 18A. Then, the anti-mixing device 18C receives the at least one mixed audio signal from the receiving device 18B, processes the at least one mixed audio signal into the N rear sub-audio signals, and outputs the N rear sub-audio signals respectively. Each of the rear loudspeakers 18D is corresponding to one of the N rear sub-audio signals and is used to receive and playback the corresponding rear sub-audio signal respectively.

If the stereo apparatus of the multi-media television 10 is a 5.1-channel stereo, both M and N will be equal to 3. The three front loudspeaker 14 are a left loudspeaker 14A, a right loudspeaker 14B, and a middle loudspeaker 14C respectively; the three rear loudspeaker 18D are a left rear loudspeaker 18D1, a bass loudspeaker 18D2, and a right rear loudspeaker 18D3 respectively. Besides, the three rear sub-audio signals can include a first rear sub-audio signal corresponding to the left rear loudspeaker 18D1, a second rear sub-audio signal corresponding to the bass loudspeaker 18D2, and a third rear sub-audio signal corresponding to the right rear loudspeaker 18D3.

Figure 2:
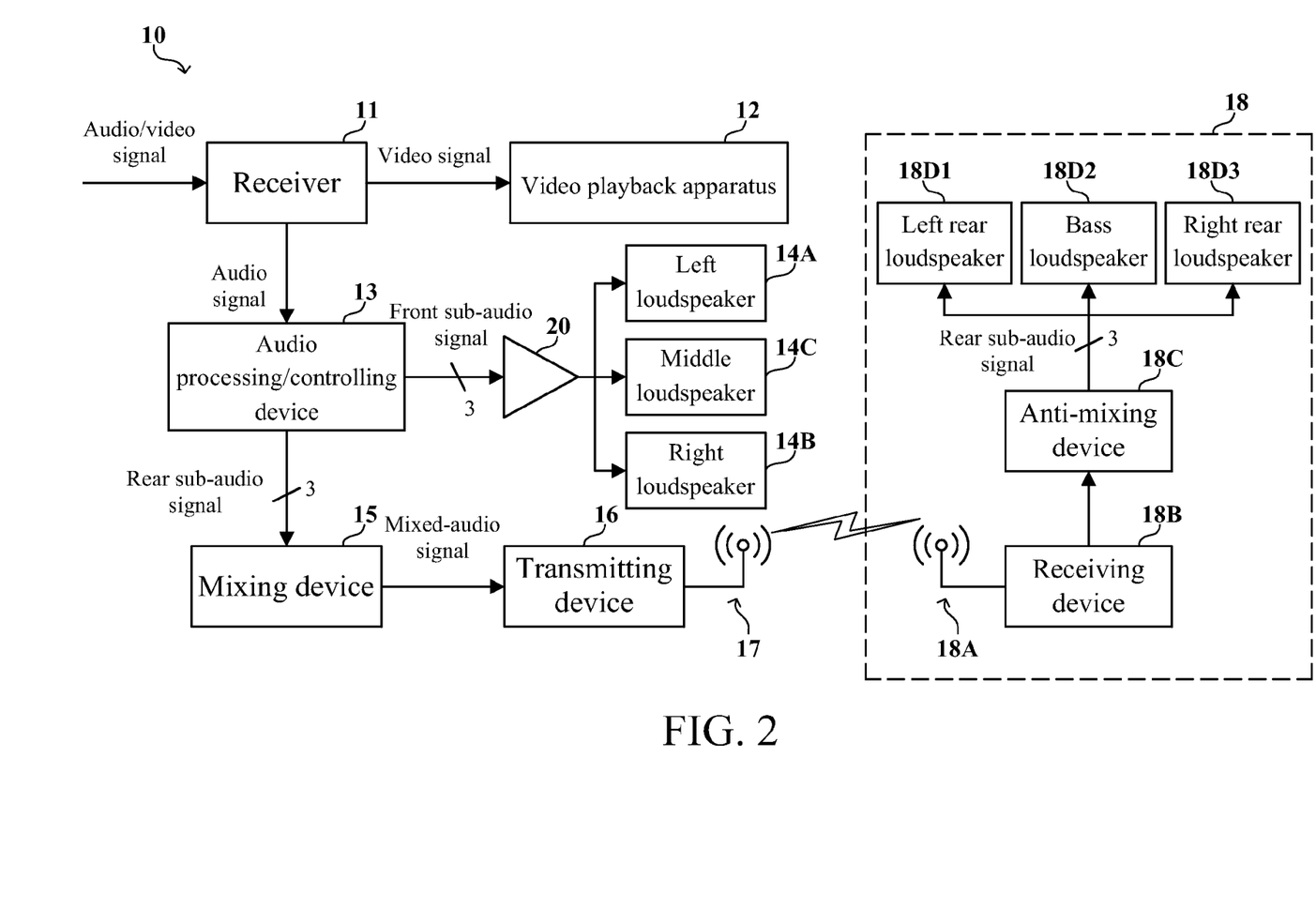
FIG. 2 is a functional block diagram of the multi-media television including a three-channel amplifier.

As shown in FIG. 2, the multi-media television 10 can further include a three-channel amplifier 20 in practical applications. The three-channel amplifier 20 is electrically connected between the audio processing/controlling device 13 and the three front loudspeakers 14, and it is used to amplify the three front sub-audio signals.

Figure 3:
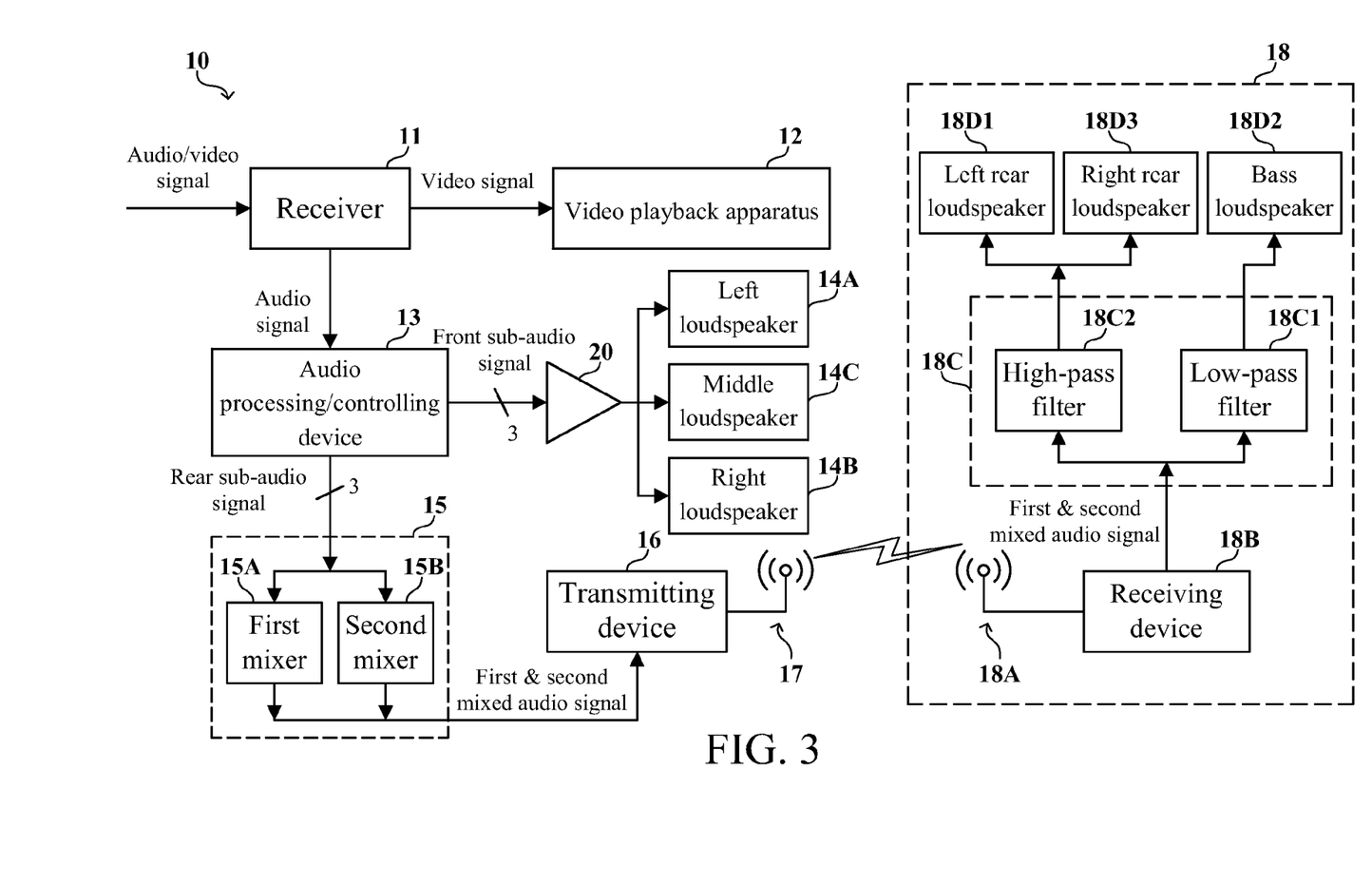
FIG. 3 is a functional block diagram of the multi-media television including a first mixer and a second mixer.

As shown in FIG. 3, the mixing device 15 can include a first mixer 15A and a second mixer 15B in practical applications. The first mixer 15A is used to receive the first rear sub-audio signal and the second rear sub-audio signal, and to mix the first rear sub-audio signal and the second rear sub-audio signal into a first mixed audio signal of the at least one mixed audio signal. The second mixer 15B is used to receive the second rear sub-audio signal and the third rear sub-audio signal, and to mix the second rear sub-audio and the third rear sub-audio signal into a second mixed audio signal of the at least one mixed audio signal.

As shown in FIG. 3, the anti-mixing device 18C relatively includes a low-pass filter 18C1 and at least one high-pass filter 18C2. The low-pass filter 18C1 is electrically connected between the receiving device 18B and the bass loudspeaker 18D2, and it is used to filter the first mixed audio signal and the second mixed audio signal to obtain the second rear sub-audio signal. Moreover, the high-pass filter 18C2 is electrically connected among the receiving device 18B, the left rear loudspeaker 18D1 and the right rear loudspeaker 18D3, and it is used to filter the first mixed audio signal and/or the second mixed audio signal to selectively obtain the first rear sub-audio signal and/or the third rear sub-audio signal.

Figure 4:
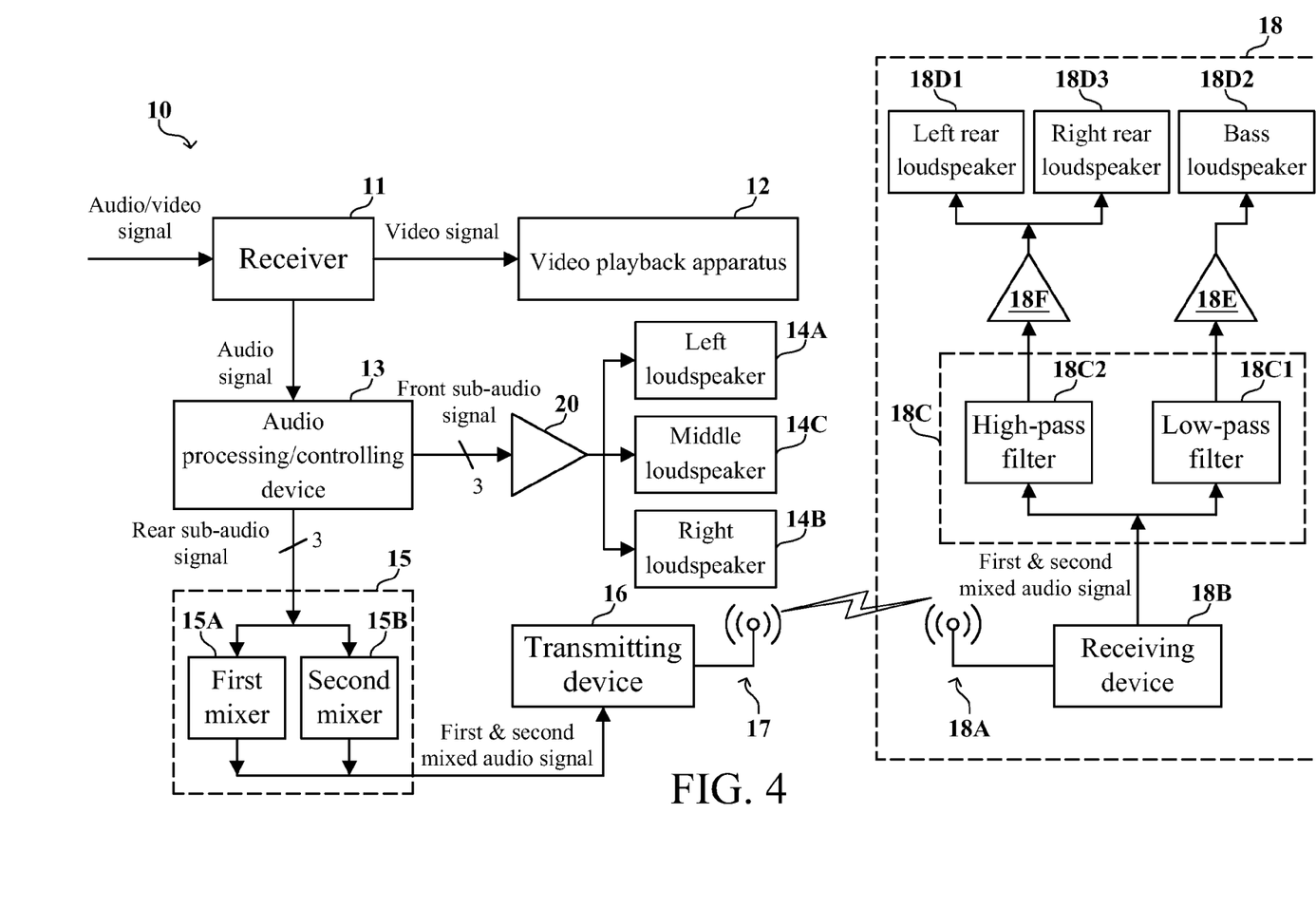
FIG. 4 is a functional block diagram of the multi-media television including a first amplifier and at least one second amplifier.

In addition, as shown in FIG. 4, the rear audio playback apparatus can further include a first amplifier 18E and at least one second amplifier 18F. The first amplifier 18E is electrically connected between the low-pass filter 18C1 and the bass loudspeaker 18D2, and it is used to amplify the second rear sub-audio signal. Moreover, the second amplifier is electrically connected among the high-pass filter 18C2, the left rear loudspeaker 18D1, and the right rear loudspeaker 18D3, and it is used to amplify the first rear sub-audio signal and the third rear sub-audio signal.

Figure 5:
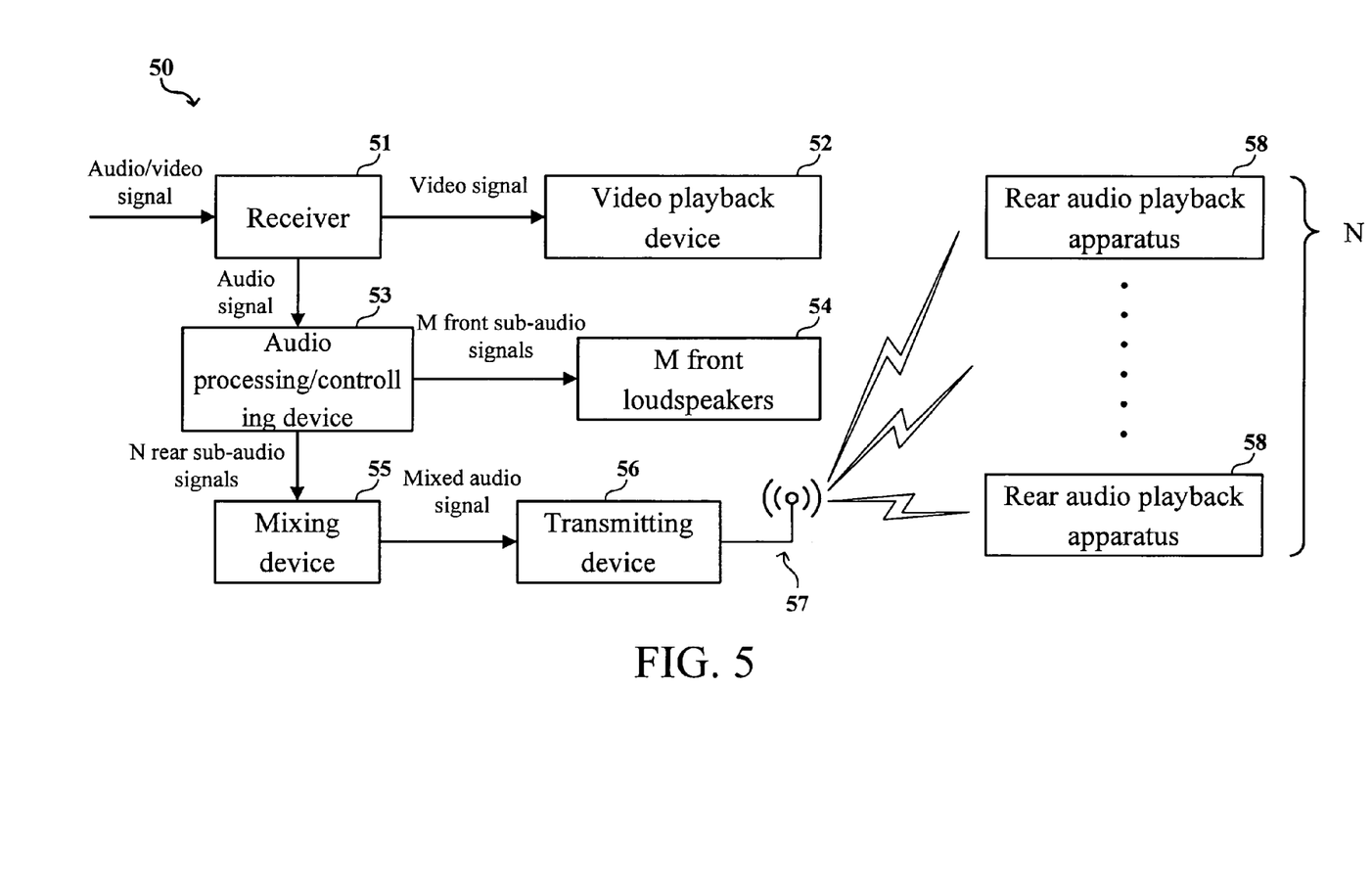
FIG. 5 is a functional block diagram of the multi-media television according to another preferred embodiment of the invention.

According to the invention, another preferred embodiment is also a multimedia television. Referring to FIG. 5, FIG. 5 is a functional block diagram of the multi-media television. The multimedia television 50 includes a receiver 51, a video playback apparatus 52, an audio processing/controlling device 53, M front loudspeaker 54, a mixing device 55, a transmitting device 56, a first antenna 57, and N rear audio playback apparatus 58.

The receiver 51 is used to receive an audio/video signal; the audio/video signal includes an audio signal and a video signal. And, the receiver 51 outputs the audio signal and the video signal respectively. The video playback apparatus 52 is electrically connected to the receiver 51, and it is used to receive and display the video signal outputted by the receiver 51. The audio processing/controlling device 53 is used to receive the audio signal outputted by the receiver and selectively processes the audio signal into a multi-channel audio signal. The multi-channel audio signal includes M front sub-audio signals and N rear sub-audio signals, wherein M and N are positive integers. And, the audio processing/controlling device 53 outputs the M front sub-audio signals and the N rear sub-audio signals respectively.

Each of the front loudspeakers 54 is corresponding to one of the M front sub-audio signals and is used to receive and playback the corresponding front sub-audio signal respectively. The mixing device 55 is used to receive the N rear sub-audio signals, and processes the N rear sub-audio signals into at least one mixed audio signal. The transmitting device 56 is electrically connected between the mixing device 55 and the first antenna 57. The transmitting device 56 receives the at least one mixed audio signal from the mixing device 55 and transmits the at least one mixed audio signal via the first antenna 57.

Figure 6:
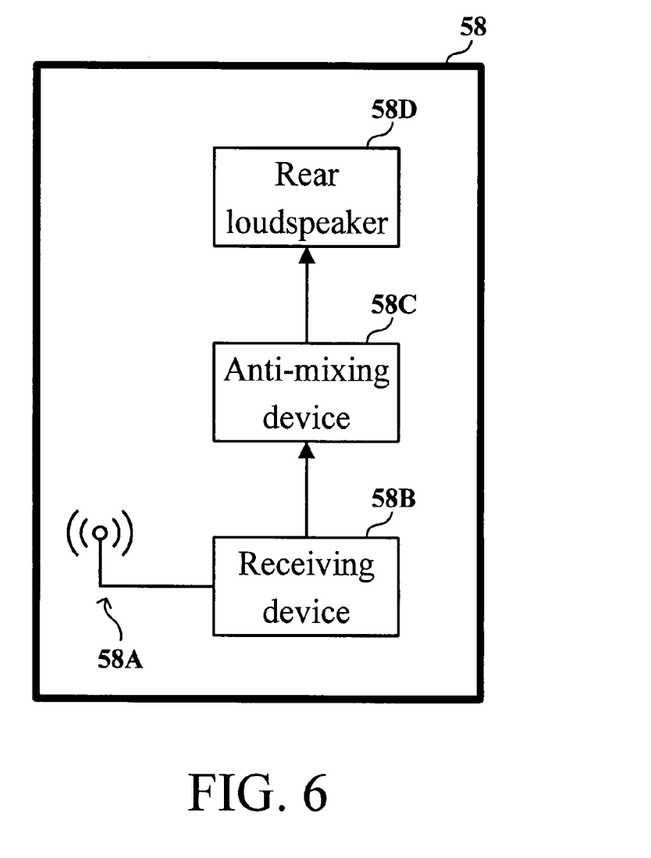
FIG. 6 is a functional block diagram of the rear audio playback apparatus.

As shown in FIG. 6, each of the rear audio playback apparatus 58 is corresponding to one of the N rear sub-audio signals respectively, and it includes a second antenna 58A, a receiving device 58B, an anti-mixing device 58C, and a rear loudspeaker 58D respectively.

The receiving device 58B of each rear audio playback apparatus 58 is used to receive the at least one mixed audio signal via the second antenna. Then, the anti-mixing device 58C receives and filters the at least one mixed audio signal from the receiving device 58B to obtain the corresponding rear sub-audio signals of the rear audio playback apparatus 58. And, the rear loudspeaker 58D is used to receive and playback the corresponding rear sub-audio signal from the anti-mixing device 58C.

According to the invention, the stereo apparatus in the multi-media television 10 and the multi-media television 50 can be a stereo having 4.1 channels, 5.1 channels, 7.1 channels, or even more channels. And, the only difference among them is the different values of M and N. As above mentioned, the audio signal is wirelessly transmitted between the rear audio playback apparatus and the audio processing/controlling device. Thus, the complex and inaesthetic connecting lines in the prior art can be prevented.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A multimedia television comprising:
   a receiver for receiving an audio/video signal, the audio/video signal comprising an audio signal and a video signal, the receiver outputting the audio signal and the video signal respectively;
   a video playback apparatus, electrically connected to the receiver, for receiving and displaying the video signal outputted by the receiver;
   an audio processing/controlling device for receiving the audio signal outputted by the receiver and selectively processing the audio signal into a multi-channel audio signal comprising M front sub-audio signals and N rear sub-audio signals, M and N being positive integers, the audio processing/controlling device outputting the M front sub-audio signals and the N rear sub-audio signals;
   M front loudspeakers, each of the front loudspeakers being corresponding to one of the M front sub-audio signals and being used to receive and playback the corresponding front sub-audio signal respectively;
   a mixing device for receiving the N rear sub-audio signals and processing the N rear sub-audio signals into at least one mixed audio signal;
   a first antenna;
   a transmitting device electrically connected to the mixing device and the first antenna, the transmitting device receiving the at least one mixed audio signal from the mixing device and transmitting the at least one mixed audio signal via the first antenna; and
   a rear audio playback apparatus comprising:
      a second antenna;
      a receiving device electrically connected to the second antenna and receiving the at least one mixed audio signal via the second antenna;
      an anti-mixing device electrically connected to the receiving device for receiving the at least one mixed audio signal from the receiving device, processing the at least one mixed audio signal into the N rear sub-audio signals and outputting the N rear sub-audio signals respectively; and
      N rear loudspeakers, each of the N rear loudspeakers being corresponding to one of the N rear sub-audio signals and being used to receive and playback the corresponding rear sub-audio signal respectively.

2. The multimedia television of claim 1, wherein M equals to 3 and the three front loudspeakers comprise a left loudspeaker, a right loudspeaker, and a middle loudspeaker.

3. The multimedia television of claim 2, further comprising:
   a three-channel amplifier electrically connected between the audio processing/controlling device and the three front loudspeakers and being used to amplify the three front sub-audio signals.

4. The multimedia television of claim 1, wherein N equals to 3 and the three rear loudspeakers comprise a left rear loudspeaker, a bass loudspeaker, and a right rear loudspeaker, the three rear sub-audio signals comprise a first rear sub-audio signal corresponding to the left rear loudspeaker, a second rear sub-audio signal corresponding to the bass loudspeaker, and a third rear sub-audio signal corresponding to the right rear loudspeaker.

5. The multimedia television of claim 4, wherein the mixing device comprises:
   a first mixer for receiving the first rear sub-audio signal and the second rear sub-audio signal and mixing the first rear sub-audio signal and the second rear sub-audio signal into a first mixed audio signal of the at least one mixed audio signal; and
   a second mixer for receiving the second rear sub-audio signal and the third rear sub-audio signal and mixing the second rear sub-audio signal and the third rear sub-audio signal into a second mixed audio signal of the at least one mixed audio signal.

6. The multimedia television of claim 5, wherein the anti-mixing device comprises:
   a low-pass filter electrically connected between the receiving device and the bass loudspeaker and being used to filter the first mixed audio signal and the second mixed audio signal to obtain the second rear sub-audio signal; and
   one or two high-pass filter electrically connected among the receiving device, the left rear loudspeaker and the right rear loudspeaker and being used to filter the first mixed audio signal and/or the second mixed audio signal to selectively obtain the first rear sub-audio signal and/or the third rear sub-audio signal.

7. The multimedia television of claim 6, wherein the rear audio playback apparatus further comprises:
   a first amplifier electrically connected between the low-pass filter and the bass loudspeaker and being used to amplify the second rear sub-audio signal; and
   one or two second amplifier electrically being connected among the high-pass filter, the left rear loudspeaker and the right rear loudspeaker and being used to amplify the first rear sub-audio signal and the third rear sub-audio signal.

8. A multimedia television comprising:
   a receiver for receiving an audio/video signal, the audio/video signal comprising an audio signal and a video signal, the receiver outputting the audio signal and the video signal respectively;
   a video playback apparatus, electrically connected to the receiver, for receiving and displaying the video signal outputted by the receiver;
   an audio processing/controlling device, electrically connected to the receiver, for receiving the audio signal outputted by the receiver and selectively processing the audio signal into a multi-channel audio signal comprising M front sub-audio signals and N rear sub-audio signals, M and N being positive integers, the audio processing/controlling device outputting the M front sub-audio signals and the N rear sub-audio signals respectively;
   M front loudspeakers, each of the front loudspeakers being corresponding to one of the M front sub-audio signals and being used to receive and playback the corresponding front sub-audio signal respectively;
   a mixing device for receiving the N rear sub-audio signals and processing the N rear sub-audio signals into at least one mixed audio signal;
   a first antenna;
   a transmitting device electrically connected to the mixing device and the first antenna, the transmitting device receiving the at least one mixed audio signal from the mixing device and transmitting the at least one mixed audio signal via the first antenna; and
   N rear audio playback apparatus, each of the rear audio playback apparatus being corresponding to one of the N rear sub-audio signals and respectively comprising:
      a second antenna;

a receiving device, electrically connected to the second antenna, for receiving the at least one mixed audio signal via the second antenna;

an anti-mixing device electrically connected to the receiving device and the receiving device receiving and filtering the at least one mixed audio signal to obtain the corresponding rear sub-audio signals; and a rear loudspeaker for receiving and playback the corresponding rear sub-audio signal.

9. The multimedia television of claim 8, wherein M equals to 3 and the three front loudspeakers comprise a left loudspeaker, a right loudspeaker, and a middle loudspeaker.

10. The multimedia television of claim 9, further comprises:

a three-channel amplifier, electrically connected between the audio processing/controlling device and the three front loudspeakers, for amplifying the three front sub-audio signals.

11. The multimedia television of claim 8, wherein N equals to 3 and the three rear loudspeakers comprise a left rear loudspeaker, a bass loudspeaker, and a right rear loudspeaker, the three rear sub-audio signals comprise a first rear sub-audio signal corresponding to the left rear loudspeaker, a second rear sub-audio signal corresponding to the bass loudspeaker, and a third rear sub-audio signal corresponding to the right rear loudspeaker.

12. The multimedia television of claim 11, wherein the mixing device comprises:

a first mixer for receiving the first rear sub-audio signal and the second rear sub-audio signal and mixing the first rear sub-audio signal and the second rear sub-audio signal into a first mixed audio signal of the at least one mixed audio signal; and a second mixer for receiving the second rear sub-audio signal and the third rear sub-audio signal, and mixing the second rear sub-audio signal and the third rear sub-audio signal into a second mixed audio signal of the at least one mixed audio signal.

13. The multimedia television of claim 12, wherein the anti-mixing device is a low-pass filter in the rear audio playback apparatus comprising the bass loudspeaker, and the anti-mixing devices is a high-pass filter respectively in the rear audio playback apparatus comprising the left rear loudspeaker and the right rear loudspeaker.

14. The multimedia television of claim 13, wherein each of the rear audio playback apparatus further comprises an amplifier that is electrically connected between the low/high-pass filter and the rear loudspeaker, and the amplifier is used to amplify the corresponding rear sub-audio signal.

* * * * *